Patented Dec. 13, 1932

1,890,875

UNITED STATES PATENT OFFICE

WALTER ZISCH, OF FRANKFORT-ON-THE-MAIN, GERMANY, ASSIGNOR, BY MESNE ASSIGNMENTS, TO THE ROESSLER & HASSLACHER CHEMICAL COMPANY, A CORPORATION OF DELAWARE

PREPARATIONS WHICH GIVE OFF OXYGEN AND MANUFACTURE OF SAME

No Drawing. Application filed January 31, 1929, Serial No. 336,630, and in Germany January 30, 1928.

This application was filed in Germany Jan. 30, 1928, D. 54,891.

This invention relates to preparations which give off oxygen, as for example, those which may be used in breathing apparatus, and a process of manufacturing same.

Such preparations, particularly those containing alkali metal peroxides which become hydrated when certain limited quantities of water are incorporated therewith, show, upon storage, a considerable loss of available oxygen which amounts to 50% or more in the course of time. This is especially true of those alkali metal peroxides which contain from about $\frac{1}{3}$ to 1 molecule of water to a molecule of peroxide.

I have now found that one can obtain stable preparations, capable when being used of readily giving up oxygen, by subjecting the above mentioned peroxides to a heating process after incorporating within them the water needed for their hydration. The temperature which I use in my process and the duration of the heating depends upon the use to which the hydrated product in its stable form is to be put. The temperature and time of processing are, among other things, greatly dependent upon the reactivity of the peroxide. In the case of active preparations, for example those which possess an apparent specific gravity—by which I mean the weight of a certain volume of the pulverulent substance compared with the weight of an equal volume of water, of only $\frac{1}{2}$, low temperatures, for example about 45-50° C., usually suffice to produce the optimum stability while more dense and less reactive preparations can withstand and even require in some cases up to 75 or 150° C. and over. The heating period depends upon the temperature. In general, a comparatively long heating period such as a few hours is necessary with low temperatures, while a shorter period and in particular instances a very short heating period, is necessary when using higher temperatures. If necessary, very reactive preparations can be converted into the desired stable form by applying heat to one spot only whereupon the heating is propagated spontaneously throughout the entire mass.

In carrying out the invention, one can incorporate $\frac{1}{3}$ to 1 molecule of water, in the form of vapor, snow, mist or the like, with the peroxide to be used, for example sodium peroxide, in a suitable mixing apparatus, while the heat produced by the hydration can be dissipated in any known manner. The peroxide is preferably used as an ordinary powder or even in a finely pulverized or voluminous form. The quantity of water to be incorporated in the peroxide can amount to about $\frac{1}{3}$ to 1 mole per mole of peroxide. The hydrated product can then be converted into the desired stable form by heating a sufficient length of time at a sufficiently high temperature. The length of time for heating and the degree of temperature most suitable can be easily determined beforehand in each case by a few simple comparative tests.

One way of carrying out the invention is to form or mold the material after incorporating the water and then to convert the resulting piece or object into the stable form by heating. The formed piece, which may be soft upon heating, becomes hard when cooled and is then ready for use, for example in breathing apparatus. The molding process may be carried out with or without the use of pressure. It is possible to heat the material before and/or after forming it. Instead of preparing small molded pieces for immediate use, one can advantageously prepare larger molded pieces, make them stable by heating them, and after cooling them down put them through a milling process to reduce them to any desired particle size, whereupon they are ready for use.

Upon sifting out the particles or grains which it is desired to use, there remain, of course, appreciable quantities of fine grained or pulverulent waste screenings. I have found, however, that these screenings can be further utilized in a very profitable manner by mixing them in suitable proportions with hydrated peroxide, which has not undergone heat treatment, and then treating this mixture further by molding, heating and granulating. This is an economic procedure which not only avoids the loss of valuable material, but increases the porosity of the resulting product. This improvement in porosity is of great value and was entirely unexpected since one would ordinarily apprehend that the hydrated material would act upon the heat treated material when mixed with it in a manner which would be detrimental to the porosity of the product.

Instead of using the peroxide "fines" from the milling process, one can incorporate inert solids such as silicic acid, diatomaceous earth, sodium chloride and the like into the preparation.

The above described preparations may be improved by adding to them catalysts for liberation of oxygen therefrom, such as oxygen compounds of copper, manganese and the like, for example the oxides of these metals. These catalysts can be added to the peroxide during its processing or can be added when manufacturing the peroxide from the alkali metal. They can also be distributed throughout the already processed peroxide as for example by dusting. I prefer, however, to incorporate the catalysts uniformly through the peroxide material before it is formed or molded. By the latter method the catalyst is always present in uniform quantities in the final granular product.

What I claim is:

1. A process for the manufacture of preparations for giving off oxygen which comprises hydrating alkali metal peroxides while dissipating the heat of reaction by incorporation of water with the latter in the ratio of about ⅓ to 1 mol of water per mol of peroxide and heating the resulting hydrated product to a temperature below 150° C.

2. A process for the manufacture of preparations for giving off oxygen which comprises hydrating alkali metal peroxides by incorporation of water with the latter in the ratio of about ⅓ to 1 mol of water per mol of peroxide while dissipating the heat of reaction and subjecting the resulting hydrated product to a molding and heating treatment at temperatures below 150° C.

3. A process for the manufacture of preparations for giving off oxygen which comprises hydrating alkali metal peroxides by incorporation of water with the latter in the ratio of about ⅓ to 1 mol of water per mol of peroxide while dissipating the heat of reaction until the hydration reaction is complete, and subjecting the resulting hydrated product to a pressure molding and heating treatment at temperatures below 150° C.

4. A process for the manufacture of preparations for giving off oxygen which comprises hydrating alkali metal peroxides by mixing water with the latter in the ratio of about ⅓ to 1 mol of water per mol of peroxide while dissipating the heat of reaction until the hydration reaction is complete, mixing the resulting hydrated product with inert solids and heating to a temperature below 150° C.

5. A process for the manufacture of preparations for giving off oxygen which comprises hydrating alkali metal peroxides by mixing water with the latter in the ratio of about ⅓ to 1 mol of water per mol of peroxide while dissipating the heat of reaction until the hydration reaction is complete, heating the resulting hydrated product to a temperature below 150° C., granulating the product mixing the fines sifted off with further quantities of said hydrated product and heating the mixture to a temperature below 150° C.

Signed at Frankfort-on-the-Main, Germany, this 10th day of January A. D. 1929.

WALTER ZISCH.